May 21, 1929.  J. N. NELSON  1,713,546
OPHTHALMIC MOUNTING
Filed Nov. 19, 1927
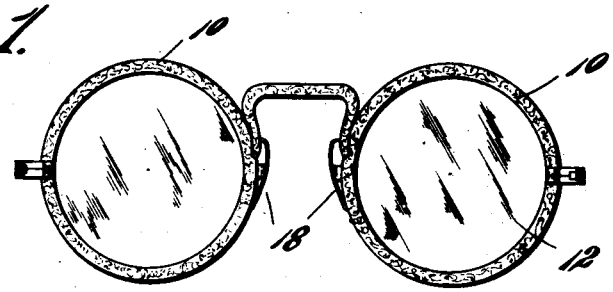
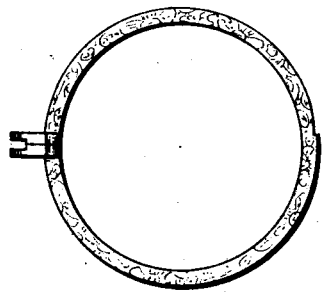
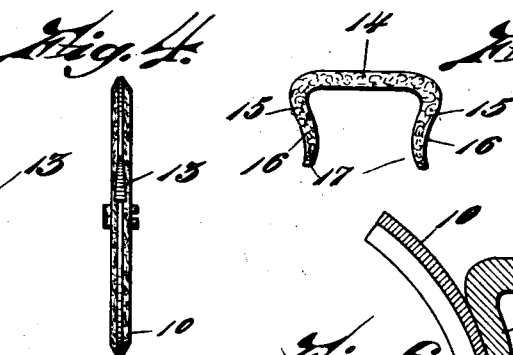
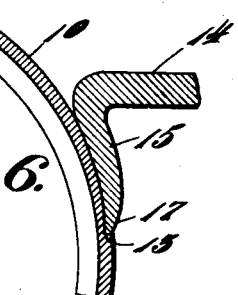
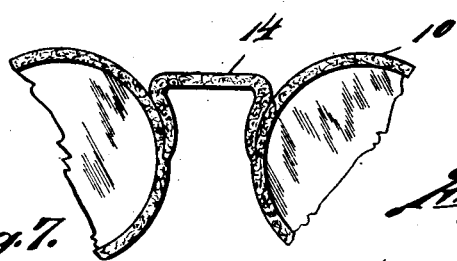
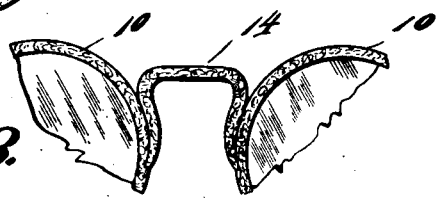
INVENTOR.
John N. Nelson,
BY Barlow & Barlow
ATTORNEYS.

Patented May 21, 1929.

1,713,546

UNITED STATES PATENT OFFICE.

JOHN N. NELSON, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

Application filed November 19, 1927. Serial No. 234,364.

This invention relates to an improved construction of ophthalmic mounting; and has for its object to provide in such a mounting a pair of spaced metal eyewires connected by a bridge member, the bridge being substantially U-shape with its arms extending downwardly along the opposite eyewires and soldered thereto, the extremities of the bridge arms extending to a point adjacent the medial line thru said eyewires.

A further object of the invention is the notching of the adjacent surfaces of the opposite eyewires, each at a point adjacent the medial line thru the eyewires for the reception of the extremities of the downwardly-turned ends of the bridge member to assist in accurately locating the same and setting the ends substantially flush with the surface of the eyewires.

With these and other objects in view, the invention consists of certain novel features of construction, as will be more fully described, and particularly pointed out in the appended claim.

In the accompanying drawings:

Fig. 1 is a front view of an ophthalmic mounting having opposite eyewires connected by my improved form of bridge member.

Fig. 2 is an edge view of the mounting.

Fig. 3 shows one of the eyewires notched on its periphery at a point adjacent the medial line thru the eyewires.

Fig. 4 is an edge view of the wire showing the notch therein.

Fig. 5 is a view of the U-shaped bridge member having its downwardly-extending arms curved to conform to the shape of the eyewires.

Fig. 6 is an enlarged view showing the bridge with one arm shaped to conform to the curvature of the eyewires to provide an elongated soldering surface with the end of the bridge extending into the notch in the eyewires.

Fig. 7 is a modification showing the ends of the bridge as extending down to the medial line of the eyewires.

Fig. 8 is a modification showing the ends of the bridge as extending down beyond the medial line thru the eyewires.

Fig. 9 is a sectional edge view of a fragmental portion of the eyewires.

Fig. 10 is a sectional end view of the bridge member.

It is found in the practical construction of ophthalmic mountings of this character particularly where the eyewires are of precious metal, and are of that class of mounting which is provided with temples, to provide a bridge member which is relatively stiff and non-yielding with its downwardly-turned arms curved to conform to the curvature of the eyewires, of advantage to provide an elongated soldering surface and to provide notches in the surface of the eyewires to receive the ends of the bridge member for the purpose of properly locating the different parts and also to permit the ends of the bridge member to lie in a plane more nearly flush with the surface of the eyewires; also by extending these arms along the surface of the thin precious metal eyewires they serve to reinforce and strengthen the wire at the point where the greatest strain is applied; and the following is a detailed description of the embodiment of my invention and showing certain constructions of bridge members whereby these advantageous results may be accomplished:—

With reference to the drawings, 10 designates the metal eyewires which may be of any desired shape in cross section, that herein shown being substantially V-shape in its outer contour, as best illustrated in Fig. 9, grooved on its inner surface as at 11 to receive the edge of the lens 12.

The peripheries of these eyewires where they are adjacent each other are preferably notched as at 13, to serve as locating points for the bridge member and also to permit the ends of the bridge member to lie more nearly flush with the surface of the eyewires. These notches are preferably formed adjacent a medial line thru the eyewires.

The bridge member 14 is preferably of substantially the same shape in cross section as that of the eyewires but is preferably made of solid stock and this bridge member is made in substantially U-shape, the arms 15 of the U extending downwardly and curved as at 16 to conform to the curvature of the periphery of the eyewires so as to provide an extended bearing and soldering surface between the eyewires and the bridge to firmly secure the same together; also the extremities 17 of this bridge member are reduced so as to extend into the notches 13 in the eyewires and lie substantially flush with the surface of the eyewires thus forming a very secure joint between the bridge and the eyewires. In some instances, the ends of the bridge may be slightly above the medial line thru the eyewires, as illustrated in Fig. 1. In other instances, these bridge ends may extend to the medial line, as illustrated in Fig. 7, while in still other instances, as illustrated in Fig. 8, they may extend slightly below the medial line.

By my improved construction of ophthalmic mounting the eyewires are firmly secured together by a substantially rigid bridge member, the side arms of which also serve to support or reinforce the eyewires at the point where it is subjected to the greatest strains.

The nose guard members 18 are preferably secured to the inner surfaces of the eyewires for supporting the frames on the nose and the temple members 19 may also be secured to these frames, if desired.

The foregoing description is directed solely towards the construction illustrated, but I desire it to be understood that I reserve the privilege of resorting to all the mechanical changes to which the device is susceptible, the invention being defined and limited only by the terms of the appended claim.

I claim:

An ophthalmic mounting having a pair of spaced metal eyewires peripherally notched on their adjacent inner edges, said notches extending upwardly a short distance from a point adjacent the medial line thru the eyewires, a relatively stiff metal bridge member of substantially U-shape connecting said wires, the arms of the U being curved to lie for a substantial distance against and follow the curvature of the periphery of the eyewires beyond the upper end of the notch and be soldered thereto, the lower end of the curved portion of each side arm being offset laterally from the natural curvature of the eyewires to extend into and be soldered in its engaged notch, and the ends of said arms being each reduced in thickness to lie in its notch substantially flush with the eyewires.

In testimony whereof I affix my signature.

JOHN N. NELSON.